United States Patent
Taneja et al.

(10) Patent No.: US 8,352,296 B2
(45) Date of Patent: Jan. 8, 2013

(54) MANAGING REAL TIME MEETING ROOM STATUS

(75) Inventors: Puneet Taneja, Bellevue, WA (US); Murali Venkataraman, Redmond, WA (US); Shiran Sathananthan, Redmond, WA (US); Eric Sather, Seattle, WA (US); Vivek Ramamoorthy, Issaquah, WA (US); Anil Kommineni, Sammamish, WA (US); Paul Egger, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 12/105,953

(22) Filed: Apr. 18, 2008

(65) Prior Publication Data

US 2009/0265280 A1 Oct. 22, 2009

(51) Int. Cl.
*G06F 15/16* (2006.01)
*G06Q 10/00* (2006.01)

(52) U.S. Cl. ............... 705/5; 705/6; 705/8; 715/751; 715/774; 709/225

(58) Field of Classification Search ............ 705/5, 6, 705/8; 340/541; 715/751, 774
See application file for complete search history.

(56) References Cited

U.S. PATENT DOCUMENTS

| | | | | |
|---|---|---|---|---|
| 4,807,155 A | | 2/1989 | Cree | 715/733 |
| 4,937,743 A | * | 6/1990 | Rassman et al. | 705/7.22 |
| 4,994,908 A | * | 2/1991 | Kuban et al. | 725/83 |
| 5,670,940 A | | 9/1997 | Holcomb | 340/543 |
| 6,614,450 B1 | * | 9/2003 | Vossler | 715/751 |
| 7,058,477 B1 | | 6/2006 | Rosen | 700/277 |
| 7,236,976 B2 | | 6/2007 | Breitenbach | 707/100 |
| 7,269,162 B1 | * | 9/2007 | Turner | 370/352 |
| 2001/0051885 A1 | * | 12/2001 | Nardulli et al. | 705/6 |
| 2002/0188490 A1 | | 12/2002 | Kruse | 705/8 |
| 2003/0097284 A1 | | 5/2003 | Shinozaki | 705/5 |
| 2003/0217142 A1 | * | 11/2003 | Bobde et al. | 709/224 |
| 2005/0071213 A1 | | 3/2005 | Kumhyr | 705/8 |
| 2005/0071426 A1 | * | 3/2005 | Shah | 709/204 |
| 2005/0246666 A1 | * | 11/2005 | Kalinoski et al. | 715/963 |
| 2006/0015376 A1 | | 1/2006 | Sattler | 705/5 |
| 2006/0035205 A1 | * | 2/2006 | Dobson et al. | 434/350 |
| 2006/0143064 A1 | * | 6/2006 | Mock et al. | 705/9 |
| 2006/0195474 A1 | * | 8/2006 | Cadiz et al. | 707/104.1 |
| 2006/0224671 A1 | * | 10/2006 | Miyata et al. | 709/204 |
| 2006/0224988 A1 | * | 10/2006 | Bedingfield | 715/774 |

(Continued)

FOREIGN PATENT DOCUMENTS

GB 2323938 A 10/1998

(Continued)

OTHER PUBLICATIONS

"Using Outlook and SharePoint for a better meeting experience," published by webarchive.org on Oct. 22, 2007 (pp. 1-3).*

(Continued)

*Primary Examiner* — John Hayes
*Assistant Examiner* — Brian Epstein
(74) *Attorney, Agent, or Firm* — Merchant & Gould (57) ABSTRACT

Presence information within a meeting room is detected and published to users for managing room availability and real time status. Various means such as motion detectors, card readers, log-in mechanisms associated with in-room computers, and the like, are used to detect presence information. Different status indicators are assigned to each room and published through a communication application or hosted service providing useful and real time information to users.

10 Claims, 8 Drawing Sheets

U.S. PATENT DOCUMENTS

| | | | | |
|---|---|---|---|---|
| 2006/0250278 | A1* | 11/2006 | Tillotson et al. | 340/932.2 |
| 2007/0036137 | A1* | 2/2007 | Horner et al. | 370/352 |
| 2007/0100831 | A1* | 5/2007 | Cox | 707/9 |
| 2007/0162315 | A1* | 7/2007 | Hodges | 705/8 |
| 2007/0182541 | A1* | 8/2007 | Harris et al. | 340/506 |
| 2007/0198708 | A1* | 8/2007 | Moriwaki et al. | 709/224 |
| 2007/0233875 | A1* | 10/2007 | Raghav et al. | 709/227 |
| 2007/0299966 | A1* | 12/2007 | Crawford et al. | 709/224 |
| 2008/0034040 | A1* | 2/2008 | Wherry et al. | 709/204 |
| 2008/0079569 | A1* | 4/2008 | Axelsen | 340/541 |
| 2008/0109289 | A1* | 5/2008 | Vivadelli et al. | 705/7 |
| 2008/0162198 | A1* | 7/2008 | Jabbour et al. | 705/5 |
| 2008/0244417 | A1* | 10/2008 | Simpson et al. | 715/751 |
| 2008/0291021 | A1* | 11/2008 | Bhogal et al. | 340/572.1 |
| 2009/0106677 | A1* | 4/2009 | Son et al. | 715/764 |
| 2009/0112926 | A1* | 4/2009 | Parker, II et al. | 707/104.1 |
| 2010/0070314 | A1* | 3/2010 | Jethani et al. | 705/6 |

FOREIGN PATENT DOCUMENTS

| | | |
|---|---|---|
| GB | 2346984 A | 8/2000 |
| JP | 2006277059 * | 8/2006 |

OTHER PUBLICATIONS

Definition of: Periodic, published by freeonlinedictionary.com, viewed Nov. 16, 2011, pp. 1 of 3.*

"Integrated Presence System Automatically Collects Data, Energizes Group Communication," New Releases in 2006, Jul. 26, 2006, 4 pages. http://www.nttdata.co.jp/en/media/2006/072600.html.

"Procedure to Check Availability Status of Meeting Rooms," Informatics Systems Management, 2 pages. http://www.whosea.org/isma/stutuscheck.htm.

"MIA VenueCheck Search Engines," 1 page. http://www.availabilitysystems.com/Latest/MIA-VenueCheck-Search-Engine.html.

* cited by examiner

MANAGING REAL TIME MEETING ROOM STATUS

BACKGROUND

Conference/meeting rooms are a common feature of modern work space. A conference/meeting room may be used for exchange of ideas between people from two to as many as the room can accommodate. Because exchange of ideas in meetings, including video conference meetings, are an important aspect of daily life for businesses and other organizations, conference/meeting rooms are typically equipped with tools for assisting participants to schedule meetings, to capture the discussions in the meetings, and so on. While commonly available scheduling applications are also used for scheduling meetings in conference rooms ahead of time, they cannot typically handle real time events such as ad-hoc meetings, availability of rooms due to shorter-than-expected or cancelled meetings, and the like.

For ad-hoc meetings, participants have to walk to the meeting rooms to determine whether a room is available or not. While a scheduling application may display room calendar information, however, that does not assure no one is currently present inside the room. The availability of a room is strictly based on whether it is scheduled and displayed through the calendaring tool for short-term planned meetings. Furthermore, occupancy information is typically not available to end users unless they walk to the meeting rooms to check whether attendees have already arrived or not.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to detecting presence information within a meeting room and managing room availability through a communication application. Presence information may be detected through various means such as motion detectors, card readers, log-in mechanisms associated with in-room computers, and the like. Different status indicators may be assigned to each room and published through the communication application providing useful and real time information to users.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, real time status of meeting rooms may be managed by detecting in-room presence and publishing status information to users. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
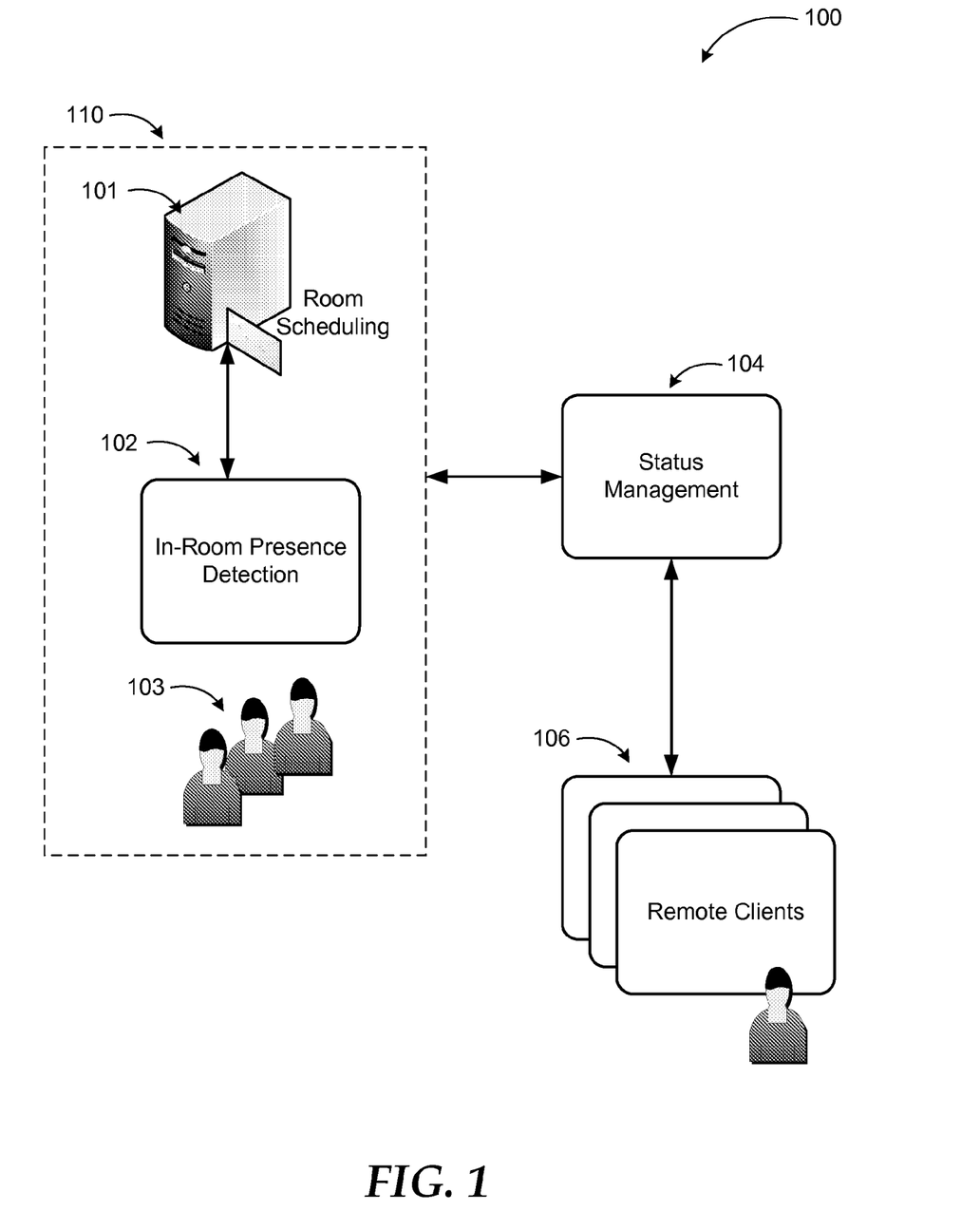
FIG. 1 is a conceptual diagram illustrating main blocks in managing real time status of a meeting room according to embodiments.

Referring to FIG. 1, a conceptual diagram of main blocks in managing real time status of a meeting room according to embodiments is provided. As discussed above, commonly available software tools provide partial or no solution for issues related to managing meeting room availability in real time. It is difficult to keep track of meeting room status for ad-hoc meetings with scheduling application based reservation systems, since those tend to show advanced scheduling of meeting rooms. In addition to trying to find an available room, some meeting participants may desire to determine if a meeting has started before walking to a meeting room to join the meeting, which would also be impossible to determine with a typical scheduling or calendaring application.

In a system according to embodiments, in-room presence detection 102 is an essential component of real time status management. Through a variety of mechanisms including, but not limited to, a motion detector, a heat sensor, an access card reader, and a log-in mechanism through an in-room computing device, presence of meeting participants (103) in a meeting room 108 may be determined. Room scheduling component 101 evaluates status of the room and passes to status management component 104 (e.g. a communications server) based on both—schedule within room calendar and in-room presence detection. Status management component 104 may then compare this information to scheduling information of the same meeting room and determine a status indicator for the meeting room. The status indicator may then be published to remote clients 106 through one-time request by any one of those or through subscription to the meeting room's presence in a communication system.

At one end of the spectrum representing the simplest approach, the status indication may simply be occupied or free (i.e. people are in the room or not). At the other end of the spectrum representing the more complicated approach, identity of people in the meeting room may be determined through an identity detection mechanism such as access card reader, a Radio Frequency Identification (RFID) reader that automatically detects identities of people from their ID cards, or a log-in mechanism through an in-room computer. The determined identity may then be compared to the scheduling information for the room resulting in establishment of whether or not the people that have reserved the room are actually using it. This information may then be published to the remote clients 106.

Of course any other status indication between these two extremes may also be implemented to provide meeting room users useful information regarding the real time status of the meeting room. Each of the components described above may be embodied as standalone or integrated applications with an optional hardware component. For example, the status management component may be part of an organization-wide communication application/service that coordinates with separate or integrated scheduling application(s).

Figure 2:
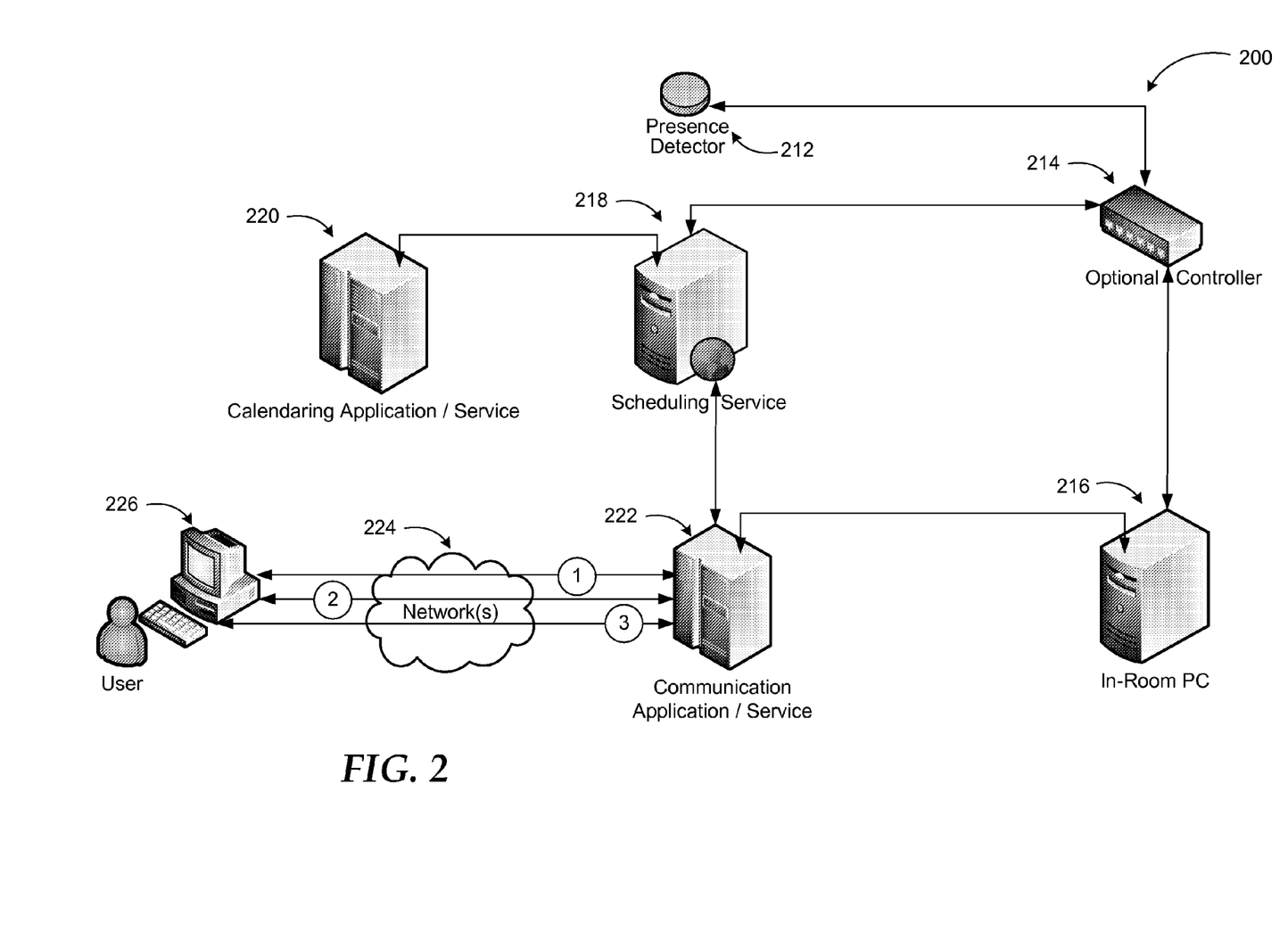
FIG. 2 is another conceptual diagram illustrating main components in managing real time status of a meeting room according to embodiments.

FIG. 2 is another conceptual diagram illustrating main components in managing real time status of a meeting room according to embodiments. Many conference rooms are outfitted with a computing device (e.g. in-room PC 216) or connection to a networked computing device through wired or wireless means. Such devices are typically used for providing meeting participants access to networked resources, capturing whiteboard contents, or even facilitating online meetings with remote locations. System 200, according to one embodiment, enables real time status detection and management of a meeting room using among others the in-room PC 216 and integrates the status management within the framework of an organization's information technology infrastructure.

One essential component of system 200 is presence detector 212. Presence detector 212 may be implemented as a motion detector, a heat sensor, an access card reader (magnetic, barcode, RFID), an RFID reader for automatic detection, and the like. While these implementations imply a hardware component, presence detector 212 may also be implemented as a log-in based (or other) identity detection mechanism executed in the in-room PC 216. Furthermore, any of the above implementations may be a standalone module or an integral part of the in-room PC 216. In case of the standalone modules, an optional controller 214 may be employed as an intermediary device between the in-room PC 216 (and/or other computing devices such as remote servers) and the module. It should be noted, that presence detector 212 may be implemented as a single device or multiple modules such as multiple motion detectors coordinated by controller 214 (e.g. in a large or irregularly shaped meeting room).

A calendaring application/service may be executed on a remote server 220 and enable users to reserve meeting rooms. An example of such an application is Microsoft Outlook® in conjunction with Exchange® server. Of course many other examples of such calendaring applications/services exist. This reservation information may be retrieved from server 220 by a status management application/service executed as part of a scheduling service in server 218. The status management application may also receive presence detection information from optional controller 214 or in-room PC 216 and determine the status of the meeting room. As discussed previously, a number of status indicators may be used for this purpose. For example, "free" may mean no meeting is scheduled and no one is present in the room; "occupied" may mean the room is being used by someone although it is not reserved; "reserved" may mean the room is reserved for a meeting but not being used currently; "in unscheduled meeting" may mean the room is being used by someone other than a person or persons who reserved the room for a meeting; and "in scheduled meeting" may mean the room is being used by the people who scheduled it for a meeting. It should be noted, that any subset of these example status indicators or others may be used in a system according to embodiments. The status management application may also be execute in the in-room PC itself. The status management application may collect presence information periodically or upon change of presence status in the room.

The status information may then be provided to a communication application/service such as Microsoft Office Communications Service® executed on server 222 for publishing to remote users. The information may be provided directly from server 218 or through in-room PC 216. The communication application in server 222 may provide status information to client devices/applications (226) for remote users through network(s) 224 in a variety of ways. For example, a relatively simpler communication client application user interface as discussed in FIG. 3 may provide the status indicator to the user (arrow 1) upon request or upon subscription to the meeting room's presence by that user. A relatively more complicated communication application (e.g. Microsoft Outlook®) client executed on client device 226 may also be used to provide the same information (arrow 2). Additionally, a web-based user interface of a collaboration service (e.g. Microsoft SharePoint®) may be used to provide status indication to a subscribing user. More details of such example user interfaces are provided in FIG. 3 through 5.

Embodiments are not limited to the components, their interactions, or functionality of the example systems in FIGS. 1 and 2. A real time meeting room status management system may be implemented with fewer or additional components, different communication methods, configuration options, and functionalities using the principles described herein.

Figure 3:
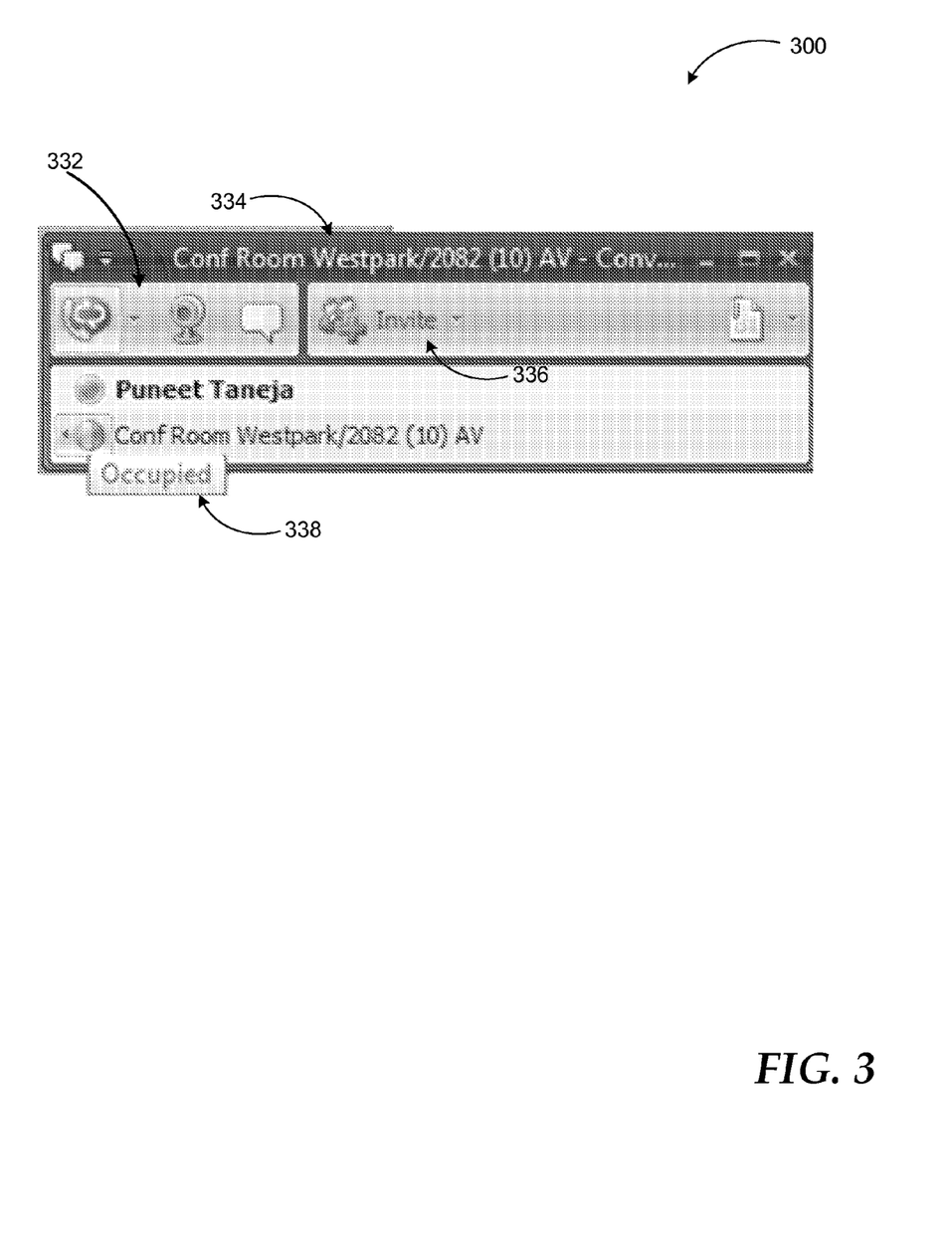
FIG. 3 illustrates an example screenshot of a communication application user interface providing meeting room status.

FIG. 3 illustrates an example screenshot of a communication application user interface providing meeting room status. Such an application (as well as the applications discussed in FIGS. 4 and 5) may be a local application residing on local computing devices or a hosted application executed by a service and used by a client device/application remotely.

In many scheduling/calendaring applications, meeting rooms are represented with aliases similar to subscribers of the system. Thus, the communication application supporting user interface 300 may be used to find and resolve the alias of the meeting room. Once the alias is resolved, the meeting room may be identified in the user interface header (334) and as one of a list of aliases of interest to the user. If the user selects the identified alias such as by clicking on it or hovering on it, a pop-up box 338 may provide the real time status information. The information may also be provided in other forms such as next to the identified alias, under the identified alias, and the like.

The user interface 300 may also include controls (332) for other functionality such as initiating (or joining) a phone call, a video conference, an instant message session, issuing an invitation 336 (including the meeting room), and the like.

Figure 4:
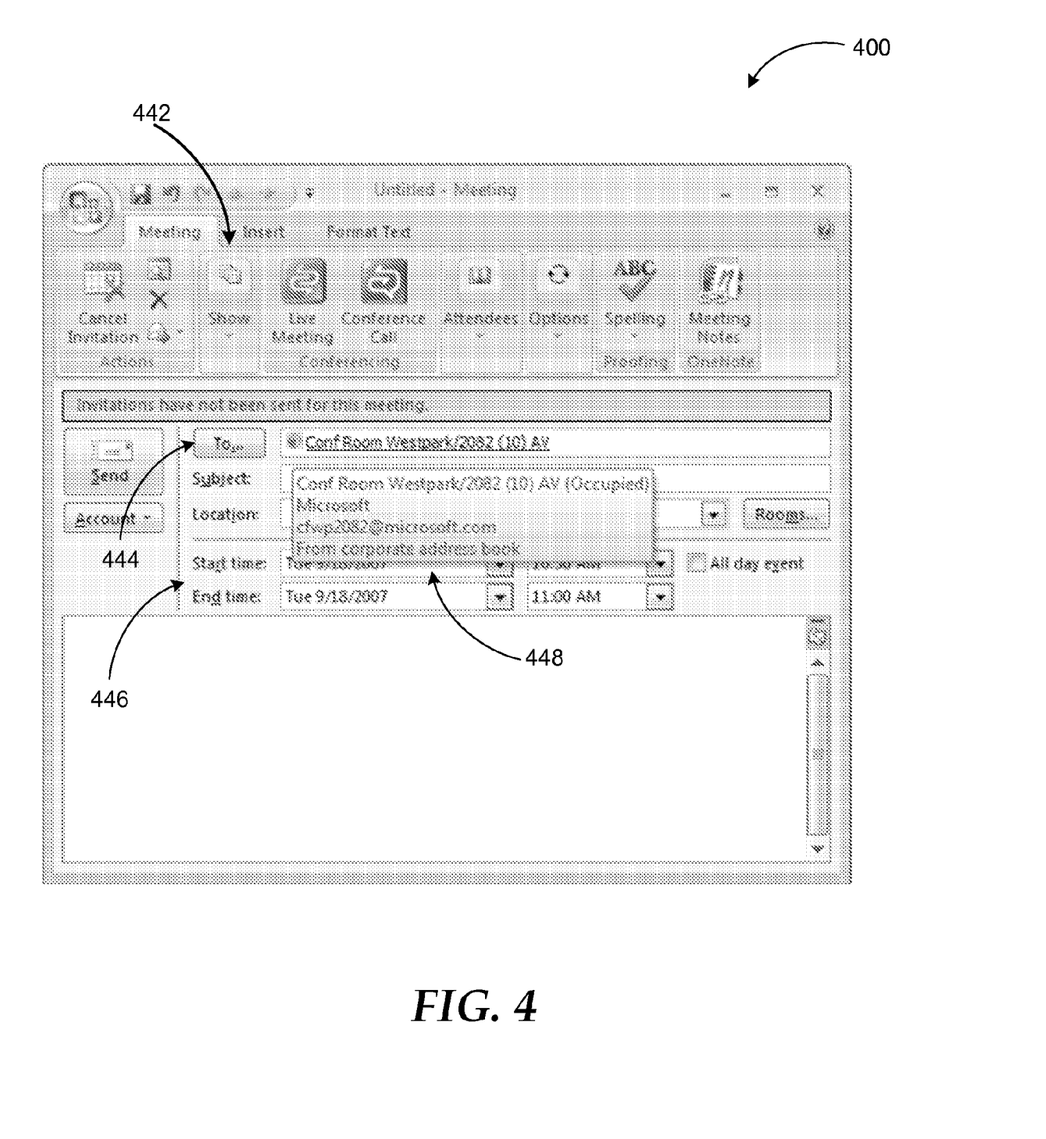
FIG. 4 illustrates another example screenshot of a calendaring/electronic mail application user interface providing meeting room status.

FIG. 4 illustrates another example screenshot of a calendaring/electronic mail application user interface providing meeting room status. User interface 400 is associated with a multi-functional application and includes a number of controls for various functionalities in form of selectable icons (e.g. 442), tabs (e.g. 443), fillable boxes (e.g. 446) and the like. User interface 400 is for organizing a meeting by designating invitees, a subject of the meeting, a location, a time, and the like. In such a user interface, the meeting room may be identified in a location box or as an alias in "TO", "CC", or "BCC" boxes (e.g. 444). As discussed above the real time status information of the meeting room may be "pushed" to the communication application by the status management application/module and upon entry of the meeting room alias, the information may be displayed next to the alia (e.g. in pop-up box 448). This way, the user is enabled to decide whether the identified conference room is available for an ad-hoc meeting right away. According to another embodiment, the communication application may request the status information from the status management application (instead of being pushed the information) upon entry of the meeting room alias by the user and provide the information after receiving it.

Figure 5:
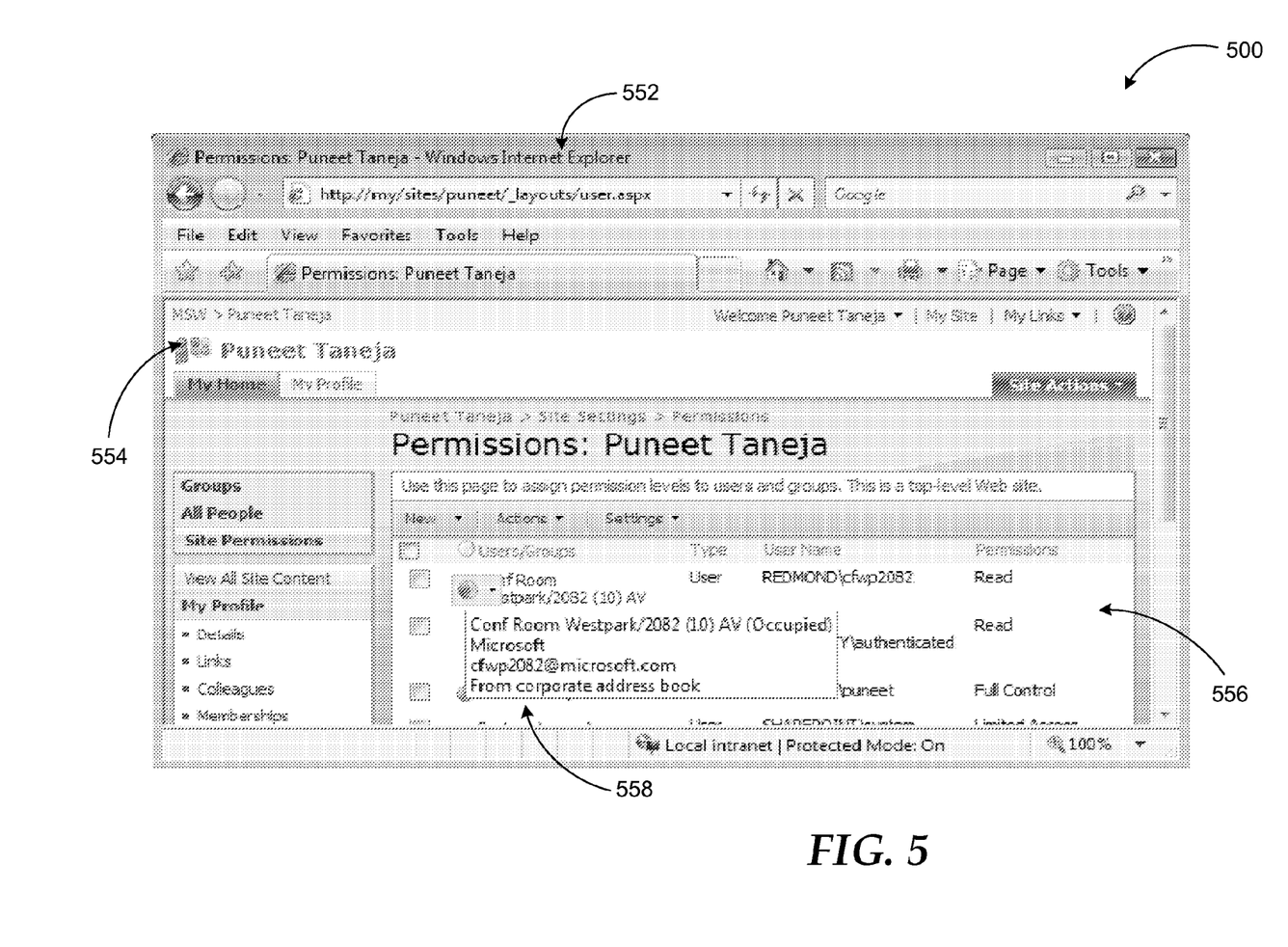
FIG. 5 illustrates a further example screenshot of a web-based collaboration service user interface providing meeting room status.

FIG. 5 illustrates a further example screenshot of a web-based collaboration service user interface providing meeting room status. Web-based collaboration services enable users to utilize networked resources through subscription and collaboration between subscribers. For example one user may subscribe to the presence of another and be notified when and how they can reach the other user. Other aspects of such services include shared use of documents, network resources, exchange of various forms of information, and the like.

While a web-based collaboration service may be accessed by a user through a client application on user's own computing device, it may also be accessed through a web-browser application (552) user interface 500 on any networked computing device. As the example user interface 500 illustrates, the user 554 is identified in the user interface along with a list of the user's subscriptions (556). As in previous examples, meeting rooms may be represented by aliases. Thus, user 554 may subscribe to a number of meeting rooms, whose real time status information may be provided next to their alias as shown in pop-up box 558. Of course, other methods of status display may be used without departing from the scope and principles of the embodiments.

The methods and systems described above for managing real time status of meeting rooms are not limited to the listed example applications, user interfaces, and presentations. Other mechanisms and configurations may also be employed for managing meeting rooms using the principles described herein.

Figure 6:
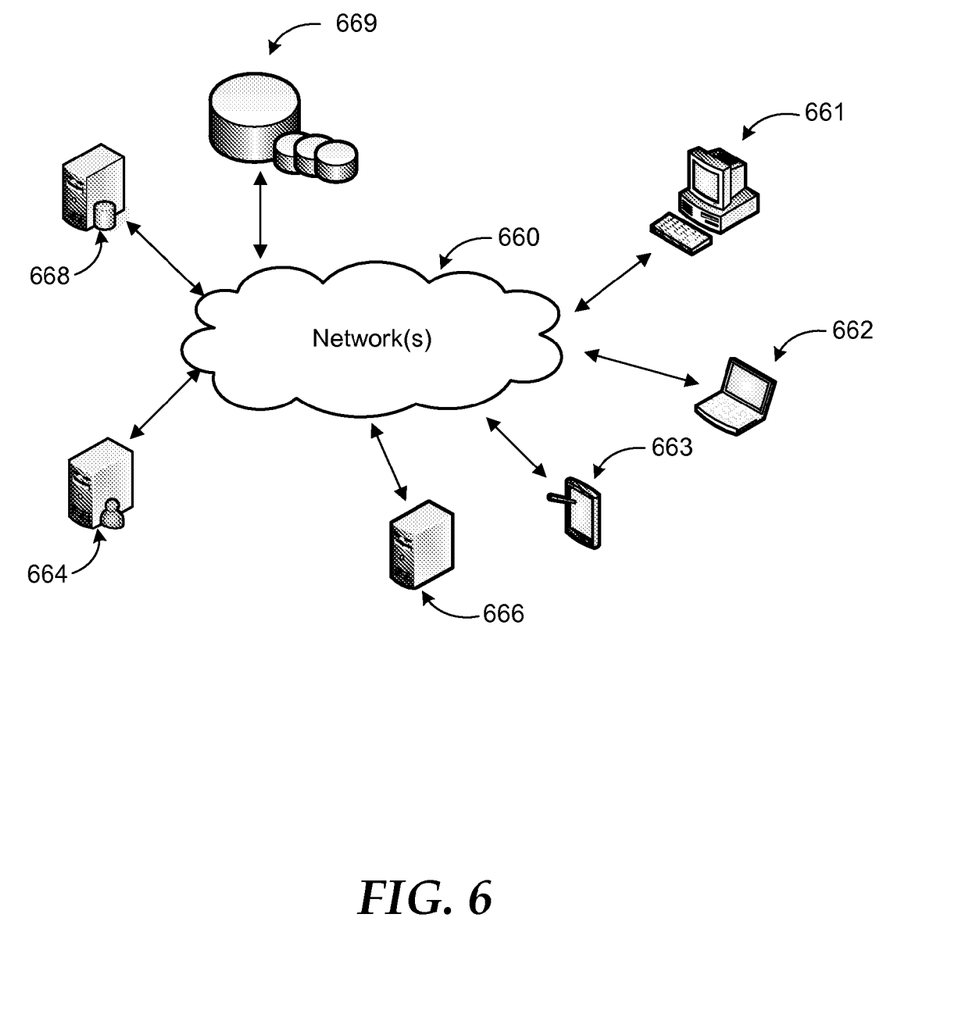
FIG. 6 illustrates a networked environment where embodiments may be implemented.

FIG. 6 is an example networked environment, where embodiments may be implemented. Meeting room status management systems according to embodiments may be implemented locally or in a distributed manner over a number of physical and virtual clients and servers. They may also be implemented in un-clustered systems or clustered systems employing a number of nodes communicating over one or more networks (e.g. network(s) 660).

Such a system may comprise any topology of servers, clients, Internet service providers, and communication media. Also, the system may have a static or dynamic topology. The term "client" may refer to a client application or a client device. While a networked system implementing embodiments may involve many more components, relevant ones are discussed in conjunction with this figure.

Meeting room status management application(s) may be executed in individual client devices 661-663 or server 666 managing a plurality of meeting rooms in an organization. The application(s) or a service managing meeting room availability may also exchange information and cooperate with scheduling, calendaring, and/or communication applications executed on server 666 or on separate servers such as server 664. Data associated with meeting room status may be stored in a variety of formats directly in a data store such as data stores 669 or through database server 668. Users may submit requests, subscribe to room presence, and/or receive status information through networks 660.

Network(s) 660 may include a secure network such as an enterprise network, an unsecure network such as a wireless open network, or the Internet. Network(s) 660 provide communication between the nodes described herein. By way of example, and not limitation, network(s) 660 may include wired media such as a wired network or direct-wired connection, and wireless media such as acoustic, RF, infrared and other wireless media.

Many other configurations of computing devices, applications, data sources, data distribution systems may be employed to implement a real time meeting room status management system. Furthermore, the networked environments discussed in FIG. 6 are for illustration purposes only. Embodiments are not limited to the example applications, modules, or processes.

Figure 7:
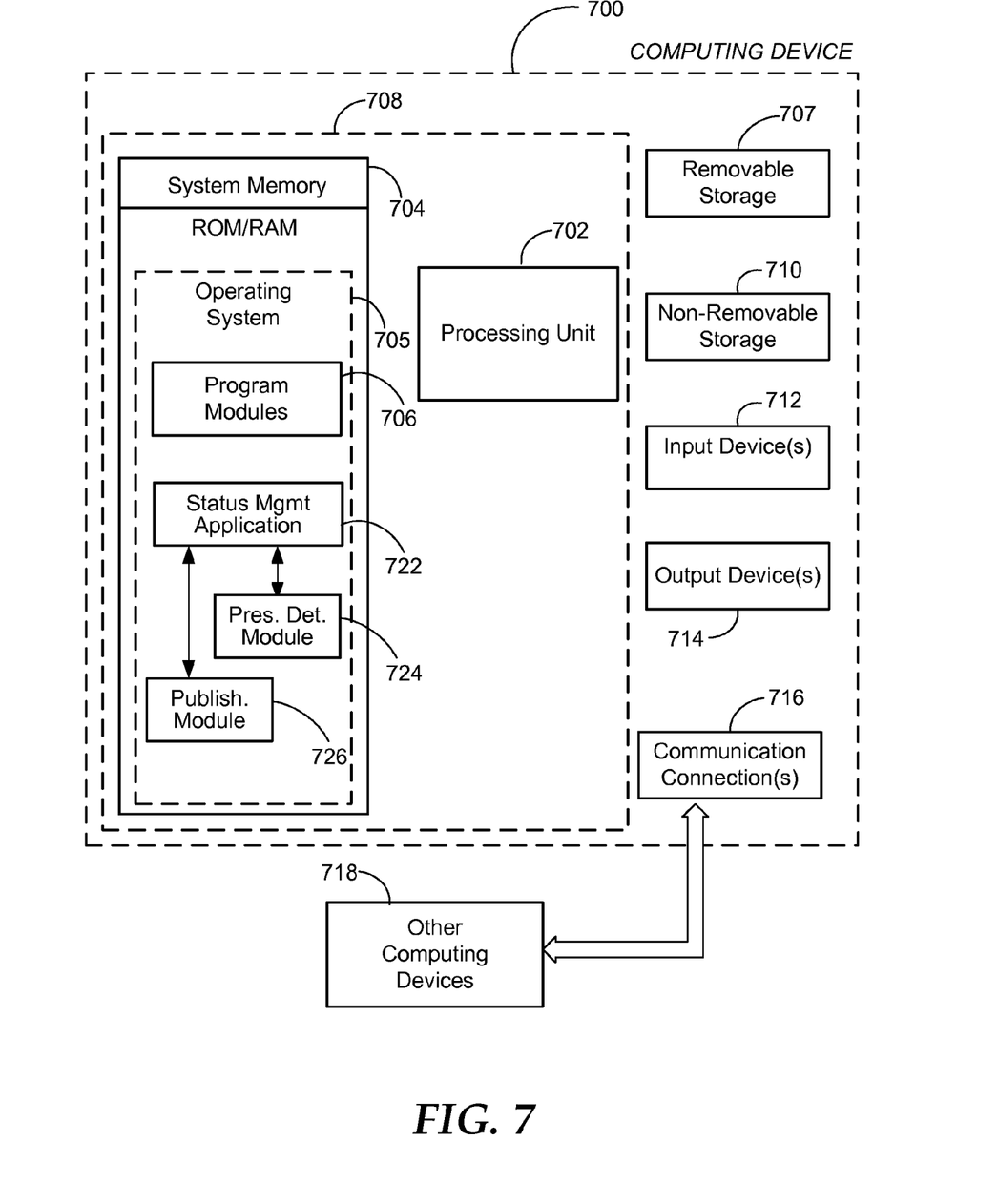
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be an in-room PC or a networked computer executing a meeting room management application/service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, status management application (service) 722, in-room presence detection module 724, and status publishing module 726.

Status management application 722 collects in-room presence information from in-room presence detection module 724, which may be implement as software, hardware, or a combination of the two, and meeting room scheduling information from a scheduling/calendaring application. These two modules may also be implemented as integral parts of the status management application 722. Status management application 722 then determines room status based on predefined status indicators and publishes the information to requesting users through status publishing module 726. Again, the status publishing module 726 may also be an integral part of the status management application 722 or a separate application. This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 707 and non-removable storage 710. Computer storage media may include volatile and nonvolatile, removable and non-removable media implemented in any method or technology for storage of information, such as computer readable instructions, data structures, program modules, or other data. System memory 704, removable storage 707 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included.

The computing device 700 may also contain communication connections 716 that allow the device to communicate with other computing devices 718, such as over a wireless network in a distributed computing environment, for example, an intranet or the Internet. Other computing devices 718 may include client devices or server(s) that execute applications enabling users to request and/or monitor meeting room availability. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
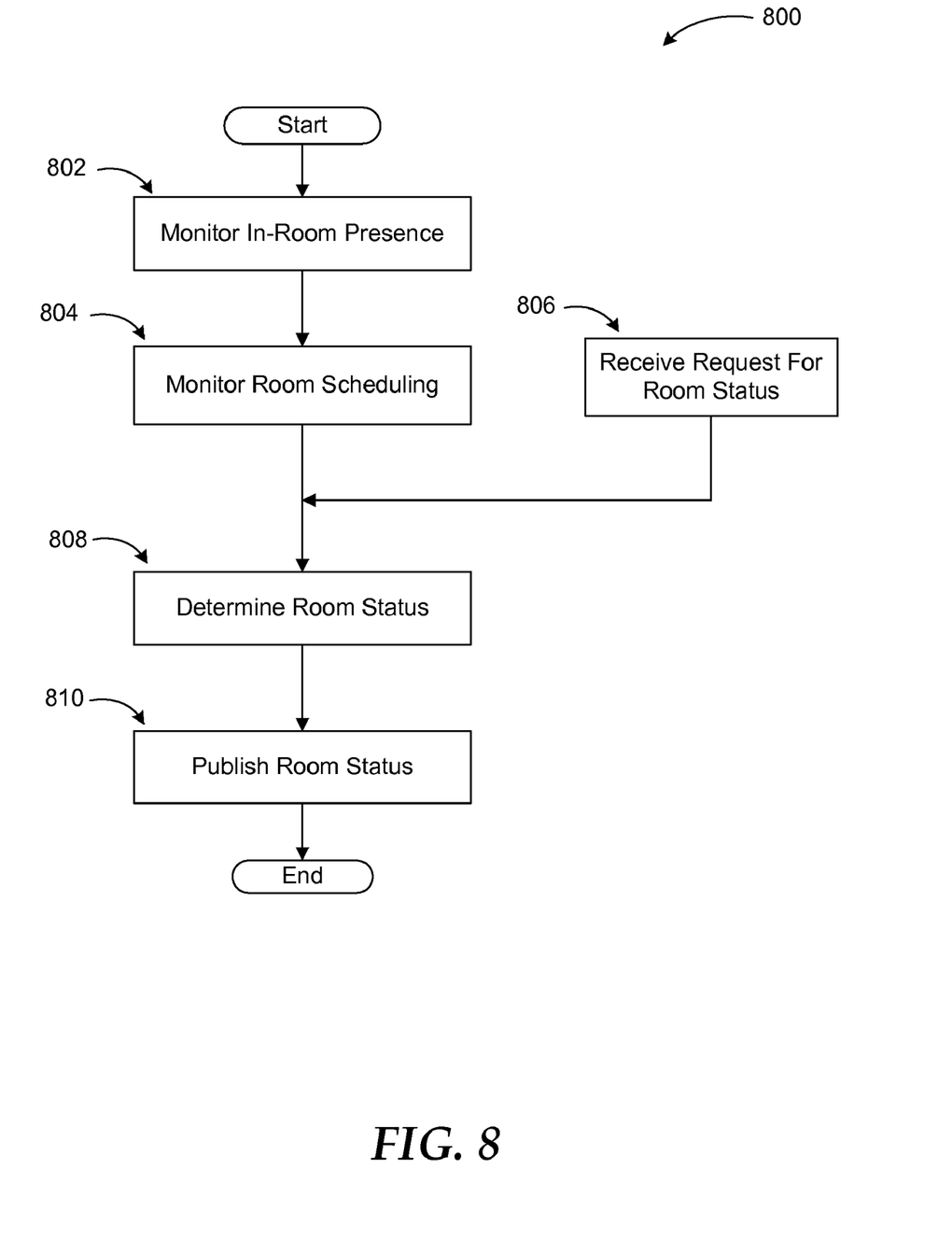
FIG. 8 illustrates a logic flow diagram for a process of managing real time status of a meeting room according to embodiments.

FIG. 8 illustrates a logic flow diagram for process 800 of managing real time status of a meeting room according to embodiments. Process 800 may be implemented, for example, in a scheduling application or hosted service managing meeting rooms in addition to providing other scheduling and management services.

Process 800 begins with operation 802, where in-room presence is monitored through various means such as motion detectors, other forms of presence sensors, access card readers, or even log-in based mechanisms that can verify the presence of one or more people in a given room. Processing moves from operation 802 to operation 804.

At operation 804, scheduling of the given meeting room is monitored. Meeting room may be scheduled for meetings through a separate application or service interactively. By monitoring the scheduling of the room, the system can determine when the room is expected to be available and when not. Moreover, the system can also be aware of who is scheduled to utilize the room.

At operation 808 following operation 804, the room's real time status is determined. This may be performed on a continuous basis or upon request by a user as indicated in operation 806. Several different status indicators such as free, occupied but not scheduled, reserved but not occupied, scheduled and occupied, and the like, may be used to provide real time status of the meeting room. Processing advances to operation 810 from operation 808.

At operation 810, the meeting room status is published to a requesting user. As mentioned above, the request may be a one-time request or subscription to the room's presence. If the process is a continuous one, processing may return to operation 802 for further monitoring of in-room presence.

The operations included in process 800 are for illustration purposes. Real time status management of meeting rooms through presence detection may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing real time meeting room status, comprising:

receiving, by a computer, in-room presence information for a meeting room, wherein the in-room presence information is received from a presence detector in response to an expiration of a predefined period;

retrieving, by the computer, room scheduling information for the meeting room;

continuously determining, by the computer, a real time status of the meeting room based on comparison of the in-room presence information and the room scheduling information, wherein a plurality of different status indicators are used to provide the real time status of the meeting room, the plurality of different status indicators comprising: free, occupied but not scheduled, reserved but not occupied, scheduled and occupied; and publishing, by the computer, the real time status of the meeting room to at least one remote client, wherein publishing the real time meeting room status to the at least one remote client comprises:

transmitting the real time meeting room status in association with a meeting room alias to a client scheduling application over a network, wherein the meeting room alias is similar to a subscriber of the client scheduling application;

finding, in a user interface, the meeting room alias;

resolving, in the user interface, the meeting room alias;

identifying, in a user interface header, the resolved meeting room alias as the meeting room and as one of a list of aliases; and providing the real time meeting room status in response to receiving a selection of the identified resolved meeting room alias, wherein the real time meeting room status is pushed to the at least one remote client and, upon entry of the meeting room alias in the user interface by the subscriber, the real time meeting room status is displayed next to the meeting room alias in the user interface, wherein providing the real time meeting room status in response to receiving a selection of the identified resolved meeting room alias comprises:

hovering over the identified resolved meting room alias in the user interface in response to a user input; and in response to hovering over the meeting room alias, displaying the real time meeting room status in a pop-up box in the user interface, the pop-up box being displayed overlaying a list of subscriptions displayed in the user interface, the list of subscriptions comprising a plurality of meeting room aliases subscribed to by a user of an application for generating the user interface.

2. The method of claim 1, further comprising:
obtaining in-room presence information based on in-room person detection through one of: a motion detector and a heat sensor.

3. The method of claim 1, further comprising:
obtaining in-room presence information based on detection of an identity of a person detection through one of: a magnetic access card reader, a barcode-based access card reader, a Radio Frequency Identification (RFID) based access card reader, and a log-in mechanism.

4. The method of claim 3, wherein the comparison of the in-room presence information and the room scheduling information includes comparison of a person reserving the meeting room for a meeting and a person currently occupying the meeting room.

5. A system for managing real time meeting room status, the system comprising:

a presence detector for detecting presence of at least one person in a meeting room;

a computer comprising a memory for storing executable program code and a processor, wherein the processor is functionally coupled to the memory, responsive to computer-executable instructions contained in the program code and operative to execute:

a calendaring application for facilitating reservation of the meeting room by users;

a status management application for receiving in-room presence information from the presence detector, the in-room presence information being collected periodically, retrieving room scheduling information from the calendaring application, continuously determining an availability status of the meeting room based on a comparison of the in-room presence information and the room scheduling information, and publishing one of a plurality of different availability status indicators for the meeting room wherein publishing the one of the plurality of different availability status indicators for the meeting room comprises transmitting the availability status in association with a meeting room alias, the plurality of different availability status indicators comprising: free, occupied but not scheduled, reserved but not occupied, scheduled and occupied, wherein the meeting room alias is similar to a subscriber of the calendaring application; and a communication application for receiving the published availability status indicator and presenting the availability status indicator to a user, wherein the communication application further:

finds, in a user interface, the meeting room alias;

resolves, in the user interface, the meeting room alias;

identifies, in a user interface header, the resolved meeting room alias as the meeting room and as one of a list of aliases; and presents the availability status indicator in response to receiving a selection of the identified resolved meeting room alias, wherein the availability status indicator of the meeting room is pushed to the communication application by the status management application and, upon entry of the meeting room alias in the user interface by the user, the availability status indicator is displayed next to the meeting room alias in the user interface, wherein the communication application receives a user input to hover over the identified resolved meeting alias and displays the availability status indicator in a pop-up box in the user interface in response to receiving the user input, the pop-up box being displayed overlaying a list of subscriptions displayed in the user interface, the list of subscriptions comprising a plurality of meeting room aliases subscribed to by a user of the communication application.

6. The system of claim 5, wherein the presence detector includes one from a set of: at least one motion detector, a magnetic access card reader, a barcode-based access card reader, an RFID based access card reader, and a log-in mechanism.

7. The system of claim 6, further comprising:
a controller for receiving detected presence information from the presence detector and making it available for the status management application.

8. The system of claim 5, wherein the status management application is executed in one of: a server coupled through a network to the presence detector and an in-room PC.

9. The system of claim 5, wherein the presence detector is an integral part of an in-room PC.

10. One or more computer-readable storage media, wherein the one or more computer-readable storage media do not consist of a propagated data signal, the one or more computer-readable storage media having stored thereon computer executable instructions which when executed perform a method for managing real time status of a meeting room, the method comprising:

receiving a subscription from a user to a presence of the meeting room;

determining a meeting room occupation status by detecting one of presence and absence of person in the meeting room, the one of the presence and the absence being detected by a status management application collecting presence information periodically;

providing the meeting occupation status to the status management application;

retrieving meeting room reservation status from a calendaring application;

continuously determining the real time status of the meeting room based on comparing the meeting occupation status with the meeting room reservation status, wherein a plurality of different status indicators are used to provide the real time status of the meeting room, the plurality of different status indicators comprising: free, occupied but not scheduled, reserved but not occupied, scheduled and occupied; and publishing the real time status of the meeting room to the subscribing user through one of a communication application user interface and a collaboration application user interface, wherein publishing the real time status of the meeting room to the subscribing user comprises:

transmitting the real time status of the meeting room to the subscribing user, in association with a meeting room alias, to a scheduling application, wherein the meeting room alias is similar to the subscribing user;

finding, in the at least one of the communication application user interface and the collaboration application user interface, the meeting room alias;

resolving, in at least one of the communication application user interface and the collaboration application user interface, the meeting room alias;

identifying, in a user interface header, the resolved meeting room alias as the meeting room and as one of a list of aliases; and providing the real time status of the meeting room to the subscribing user in response to receiving a selection of the identified resolved meeting room alias, wherein the real time status of the meeting room is pushed to a communication application by the status management application and, upon entry of the meeting room alias in the communication application user interface by the subscribing user, the real time status of the meeting room is displayed next to the meeting room alias in the communication application user interface, wherein providing the real time status of the meeting room to the subscribing user in response to receiving a selection of the identified resolved meeting room alias comprises:

hovering over the identified resolved meting room alias in the user interface in response to a user input; and     in response to hovering over the meeting room alias, displaying the real time status of the meeting room in a pop-up box in the user interface the pop-up box being displayed overlaying a list of subscriptions displayed in the communication application user interface, the list of subscriptions comprising a plurality of meeting room aliases subscribed to by the subscribing user.

* * * * *